US010353382B2

(12) United States Patent
Bodenstein (10) Patent No.: US 10,353,382 B2
(45) Date of Patent: Jul. 16, 2019

(54) CONTROL MEMBER WITH ELECTRONIC EVALUATION OF THE HAPTIC FEEDBACK (71) Applicant: Preh GmbH, Bad Neustadt a.d. Saale (DE)

(72) Inventor: Tobias Bodenstein, Salz (DE)

(73) Assignee: Preh GmbH, Bad Neustadt a.d. Saale (DE)

( * ) Notice: Subject to any disclaimer, the term of this patent is extended or adjusted under 35 U.S.C. 154(b) by 335 days.

(21) Appl. No.: 15/348,032

(22) Filed: Nov. 10, 2016

(65) Prior Publication Data
US 2017/0139405 A1 May 18, 2017

(30) Foreign Application Priority Data

Nov. 13, 2015 (DE) .................. 10 2015 119 615
Mar. 2, 2016 (DE) .................. 10 2016 103 766

(51) Int. Cl.
*G05B 19/418* (2006.01)
*G06F 3/01* (2006.01)
(Continued)

(52) U.S. Cl.
CPC ......... *G05B 19/4189* (2013.01); *G06F 3/016* (2013.01); *H01F 7/1638* (2013.01);
(Continued)

(58) Field of Classification Search
None
See application file for complete search history.

(56) References Cited

U.S. PATENT DOCUMENTS

| 8,232,969 B2 | 7/2012 | Grant et al. |
| 9,448,613 B1 * | 9/2016 | Liljegren ................ G08B 6/00 |
| 2013/0002587 A1 * | 1/2013 | Biggs ...................... G06F 3/016 |
| | | 345/173 |

FOREIGN PATENT DOCUMENTS

DE    102013007962 A1    11/2014

OTHER PUBLICATIONS

Communication from the German Patent Office dated Mar. 16, 2018 for corresponding German Application No. 10 2016 103 766.4.

* cited by examiner

*Primary Examiner* — Cory W Eskridge
(74) *Attorney, Agent, or Firm* — Walter|Haverfield LLP; Sean F. Mellino; D. Peter Hochberg (57) ABSTRACT An assembly consisting of a control member which comprises a carrier, an operating part movably supported on the carrier, an electromagnetic actuator comprising an armature and a coil for driving the operating part movingly relative to the carrier is provided. The assembly further comprises an electronic control system connected in an electrically conductive manner with the electromagnetic actuator for applying a control voltage to the electromagnetic actuator for a predetermined control period in a control step in order to generate a haptic feedback; a measuring circuit connected in an electrically conductive manner to the electromagnetic actuator for measuring a current present at the electromagnetic actor and for generating a measuring signal proportional thereto; and an evaluation unit connected in an electrically conductive manner at least to the measuring circuit and designed, in a measuring step offset in time relative to the control step, to apply a measuring voltage to the electromagnetic actuator by the electronic control system for a predetermined test period shorter than the control period, in order to measure by the measuring circuit the (Continued)

current which arises at the electromagnetic actuator as the test period elapses due to the application of the measuring voltage and to generate a measuring signal proportional thereto, and in order to obtain a characteristic value of the actuator based on the measuring signal.

36 Claims, 4 Drawing Sheets

(51) Int. Cl.
*H01F 7/16* (2006.01)
*H01F 7/18* (2006.01)

(52) U.S. Cl.
CPC . *H01F 7/1844* (2013.01); *G05B 2219/31361* (2013.01); *H01F 2007/1861* (2013.01); *Y02P 90/02* (2015.11)

CONTROL MEMBER WITH ELECTRONIC EVALUATION OF THE HAPTIC FEEDBACK

CROSS-REFERENCE TO RELATED APPLICATION

This application claims foreign priority of German application Serial Numbers DE 10 2015 119 615.8 filed on Nov. 13, 2015 and DE 10 2016 103 766.4 filed on Mar. 2, 2016, the entireties of which are incorporated herein by reference.

BACKGROUND OF THE INVENTION

Field of the Invention

The invention relates to a control member comprising: a carrier, an operating part movably supported on the carrier, an electromagnetic actuator comprising an armature and a coil for driving the operating part movingly relative to the carrier, the assembly further comprising an electronic control system connected in an electrically conductive manner with the electromagnetic actuator for applying a control voltage to the electromagnetic actuator for a predetermined control period in a control step in order to generate a haptic feedback.

Description of the Prior Art

Regularly, there is a problem with such control members with electromagnetic actuators in that the generated haptic feedback, i.e. the strength of the impact or vibration excitation, varies to a great extent depending on the mechanical tolerances, in particular the tolerances relating to the relative orientation of the armature and the coil, possibly of the iron core and the armature, but also depending on the temperature and air humidity. This is unwanted. Therefore, there is a demand for a test method and an assembly for carrying out this method for detecting such tolerances on the operating part without any measurement, if possible, in order to carry out a mechanical readjustment of the relative arrangement if necessary. Furthermore, there is a demand for a control method and a corresponding assembly, which are capable of taking account of changes in the haptic feedback or compensate them at least partially, which are the result, for example, of mechanical changes of the actuator occurring during operation or due to the change of external influences, such as temperature and air humidity. These changes may be the result of, for example, excessive heating or wear in the mounting or bearing arrangement of the operating part. It was found that, in particular, electromagnetic actuators with a flat-armature design are affected by this problem because their advantageously great driving force varies greatly depending on the minimum distance (=resting distance) between the armature and the coil. At least during operation, manually measuring this distance is difficult.

SUMMARY OF THE PRESENT INVENTION

Against this background, the object on which the invention is based lies in providing an assembly which comprises, among other things, a control member and in which the haptic feedback associated with the control member and generated by an actuator is improved and, in particular, can be determined with respect to its action, so that it can be examined, if necessary, and adapted if required.

This object is achieved by an assembly according to claim 1. Advantageous embodiments are in each case the subject matter of the dependent claims. Equally advantageous methods are in each case the subject matter of the independent claims. It must be noted that the features cited individually in the claims can be combined with each other in any technologically meaningful manner and represent other embodiments of the invention. The description, in particular in connection with the figures, additionally characterizes and specifies the invention.

The invention relates to an assembly including a control member, an electronic control system connected to the electromagnetic actuator in an electrically conductive manner, a measuring circuit connected to the electromagnetic actuator in an electrically conductive manner, and an evaluation unit connected in an electrically conductive manner at least to the measuring circuit. The control member has a carrier, an operating part movably supported on the carrier, and an electromagnetic actuator. The actuator comprises an armature and a coil for driving the operating part movingly relative to the carrier. According to a preferred embodiment, the actuator is counteracted by returning means which cause an elastic return of the operating part into its initial position, hereinafter referred to as the rest position.

The electronic control system provided according to the invention is provided for applying a control voltage to the electromagnetic actuator for a predetermined control period in a control step in order to generate a haptic feedback. The measuring circuit is provided for measuring a current present at the electromagnetic actuator and for generating a measuring signal proportional thereto. The evaluation unit provided according to the invention is designed, in a measuring step offset in time relative to the control step, to apply a measuring voltage to the electromagnetic actuator by means of the electronic control system for a predetermined test period shorter than the control period, in order to measure the current which arises at the electromagnetic actuator as the test period elapses due to the application of the measuring voltage, and to generate a measuring signal proportional thereto, and in order to obtain a characteristic value of the actuator based on the measuring signal. This makes a check of the function of the assembly according to the invention possible.

Preferably, the characteristic value relates to an inductance of the actuator, for example at the point in time at which the test period elapses, more preferably its inductance in the rest position. The term inductance in the rest position means the inductance value of the actuator that results when the operating part, and thus the actuator, just about remain in the rest state, for example due to inertia and friction effects, and before their departure from the rest position is caused. The inductance in the rest position is estimated, for example, based on the current resulting from the application of the measuring voltage as the test period elapses.

Preferably, the test period is selected in such a way that the saturation current is not reached by the actuator or its coil. The saturation current is understood to be the current at which a linear, for example (exponential), rise of the current during the application of the measuring voltage, which is substantially determined by the inductance, ends and is now substantially and over the further course determined predominantly by the ohmic resistance and the size of the voltage present.

Preferably, the test period and the measuring voltage are selected in such a way that the acceleration of the non-operated operating part caused in the measuring step is less than 2.5 g, preferably less than 1.5 g, more preferably less than 0.5 g. A non-operated operating part is understood to be a "freely movable" operating part, i.e. an operating part that is not subjected to load due to contact with or operation by an input means, such as the finger of an operator.

According to a preferred variation, the test period is less than 5.0 ms, more preferably less than 2.0 ms, still more preferably 1.0 ms, most preferably 0.5 ms.

For example, the maximum absolute value of the measuring voltage corresponds to the maximum absolute value of the control voltage. Preferably, the maximum absolute value of the measuring voltage is less than the maximum absolute value of the control voltage.

The measuring voltage and/or the control voltage are preferably configured as a square-wave signal; preferably, both are pulse width modulated.

According to a preferred embodiment, the evaluation unit and the electronic control system are connected in an electrically conductive manner and are designed to vary the control period and/or the control voltage depending on the characteristic value obtained in the measuring step. This enables a correction of the haptic feedback, and in particular a compensation of changes relating to the haptic feedback which occur during operation.

Preferably, the coil and the armature are disposed in such a way that the armature is disposed outside the volume defined by the coil in all positions and is preferably configured as a flat armature. The term flat armature in the sense of the invention is to be interpreted broadly and is supposed to relate to such electromagnetic actuators in which the armature on principle does not enter the coil interior of the coil generating the magnetic field. Particularly with regard to its shape, the armature is otherwise supposed to be configured in any way. For example, a ferromagnetic core, for example an iron core, is further disposed in the interior of the coil, as a field-concentrating or field-directing measure.

According to a preferred embodiment, at least the electrically conductive connection between the electromagnetic actuator and the evaluation unit and/or between the electromagnetic actuator and/or the measuring circuit is configured in a detachable manner. If required, for example in the event of maintenance, the control member can thus be examined.

In a preferred embodiment with a simple design, the measuring circuit is configured as a voltage divider, and the current is determined based on a voltage present at the voltage divider. For example, the characteristic value of the actuator is determined by means of an analog-digital converter from the voltage present at the voltage divider at the point in time at which the test period elapses.

Preferably, the electronic control system and/or the electronic evaluation system are attached to the control member in order thus to form a fixed component of the assembly according to the invention.

The invention further relates to a test method. This test method includes a step of providing a control member comprising a carrier, an operating part movably supported on the carrier, an electromagnetic actuator comprising an armature and a coil for driving the operating part movingly relative to the carrier.

In another subsequent, simultaneous or preceding providing step, an electronic control system connected in an electrically conductive manner to the electromagnetic actuator for applying a measuring voltage to the actuator is provided. In another subsequent, simultaneous or preceding providing step, a measuring circuit connected in an electrically conductive manner to the electromagnetic actuator for measuring a current present at the electromagnetic actor and for generating a measuring signal proportional thereto is furthermore provided. In another subsequent, simultaneous or preceding providing step, an evaluation unit connected in an electrically conductive manner at least to the measuring circuit is provided.

In a step subsequent to the above-described providing steps, a measuring voltage is applied to the electromagnetic actuator by means of the electronic control system for a predetermined test period. In a simultaneous measuring step, the current which arises at the electromagnetic actuator as the test period elapses due to the application of the measuring voltage is measured and a measuring signal proportional to the measured current is generated by means of the measuring circuit. In a subsequent evaluation step, an evaluation of the measuring signal and an assignment to a value that is characteristic for the electromagnetic actuator takes place using the evaluation unit. For example, the characteristic value relates to an inductance of the actuator. Preferably, this characteristic value relates to its inductance in the rest position. In a comparatively simple manner and particularly during operation, the test method according to the invention makes it possible to check the function of the assembly according to the invention.

Preferably, the test period is selected in such a way that the saturation current is not reached by the actuator or its coil. The saturation current is understood to be the current at which a linear rise of the current during the application of the measuring voltage, which is substantially determined by the inductance, ends and is now substantially and over the further course determined predominantly by the ohmic resistance and the size of the voltage present.

Preferably, the test period and the measuring voltage are also selected in the test method in such a way that the acceleration of the non-operated operating part caused in the measuring step is less than 2.5 g, preferably less than 1.5 g, more preferably less than 0.5 g. A non-operated operating part is understood to be a "freely movable" operating part, i.e. an operating part that is not subjected to load due to contact with or operation by an input means, such as the finger of an operator.

According to another embodiment of the test method according to the invention, in a final adjusting step subsequent to the evaluation step, the relative arrangement of the armature and the coil is changed, such as varied or adjusted, depending on the characteristic value.

The invention further relates to a control method, also referred to as an adaptive control method, with the following steps. This test method comprises a step of providing a control member. This control member comprises a carrier, an operating part movably supported on the carrier, an electromagnetic actuator comprising an armature and a coil for driving the operating part movingly relative to the carrier.

In another subsequent, simultaneous or preceding providing step, an electronic control system connected in an electrically conductive manner to the electromagnetic actuator for applying a control voltage and a measuring voltage to the actuator is provided.

In another subsequent, simultaneous or preceding providing step, a measuring circuit connected in an electrically conductive manner to the electromagnetic actuator for measuring a current present at the electromagnetic actor and for generating a measuring signal proportional thereto is furthermore provided.

In another subsequent, simultaneous or preceding providing step, an evaluation unit connected in an electrically conductive manner at least to the measuring circuit is provided.

In a step subsequent to the above-described providing steps, a measuring voltage is applied to the electromagnetic actuator by means of the electronic control system for a predetermined test period. In a simultaneous measuring step, the current which arises at the electromagnetic actuator as the test period elapses due to the application of the measuring voltage is measured and a measuring signal proportional to the measured current is generated by means of the measuring circuit. In a subsequent evaluation step, an evaluation of the measuring signal and an assignment to a value that is characteristic for the electromagnetic actuator takes place using the evaluation unit. For example, the characteristic value relates to an inductance of the actuator. Preferably, this characteristic value relates to its inductance in the rest position.

In a subsequent step, a specific control voltage and/or a specific control period is determined using the characteristic value, for example by a comparison with predetermined values by the evaluation unit.

In a subsequent control step, the electromagnetic actuator is controlled with at least one of the specific control voltage and the specific control period by means of the electronic control system. This control step is triggered, for example, by the detection of a contact or operation of the operating part.

Because of the control method according to the invention, it is thus possible to be able to carry out an adjustment of the control by varying the control voltage and/or the control period, in particular during operation, without interfering with the actuator, in particular without changing the relative arrangement of its armature and coil.

According to a preferred variation of the method, it is provided that the test period is shorter than the control period, in particular than the specific control period.

Preferably, the test period is selected in such a way that the saturation current is not reached by the actuator or its coil. The saturation current is understood to be the current at which a linear rise of the current during the application of the measuring voltage, which is substantially determined by the inductance, ends and is now substantially and over the further course determined predominantly by the ohmic resistance and the size of the voltage present.

Preferably, the test period and the measuring voltage are selected in such a way that the acceleration of the non-operated operating part caused in the measuring step is less than 2.5 g, preferably less than 1.5 g, more preferably less than 0.5 g. A non-operated operating part is understood to be a "freely movable" operating part, i.e. an operating part that is not subjected to load due to contact with or operation by an input means, such as the finger of an operator.

According to a preferred variation, the test period is less than 5.0 ms, more preferably less than 2.0 ms, still more preferably 1.0 ms, most preferably 0.5 ms.

The assembly according to the invention and the control method according to the invention are preferably used in a motor vehicle.

BRIEF DESCRIPTION OF THE DRAWINGS

This and other objects, advantages and features of the invention will become obvious from the following detailed description of preferred exemplary embodiments of the invention in conjunction with the drawings.

DETAILED DESCRIPTION OF THE PRESENT INVENTION

Figure 1:
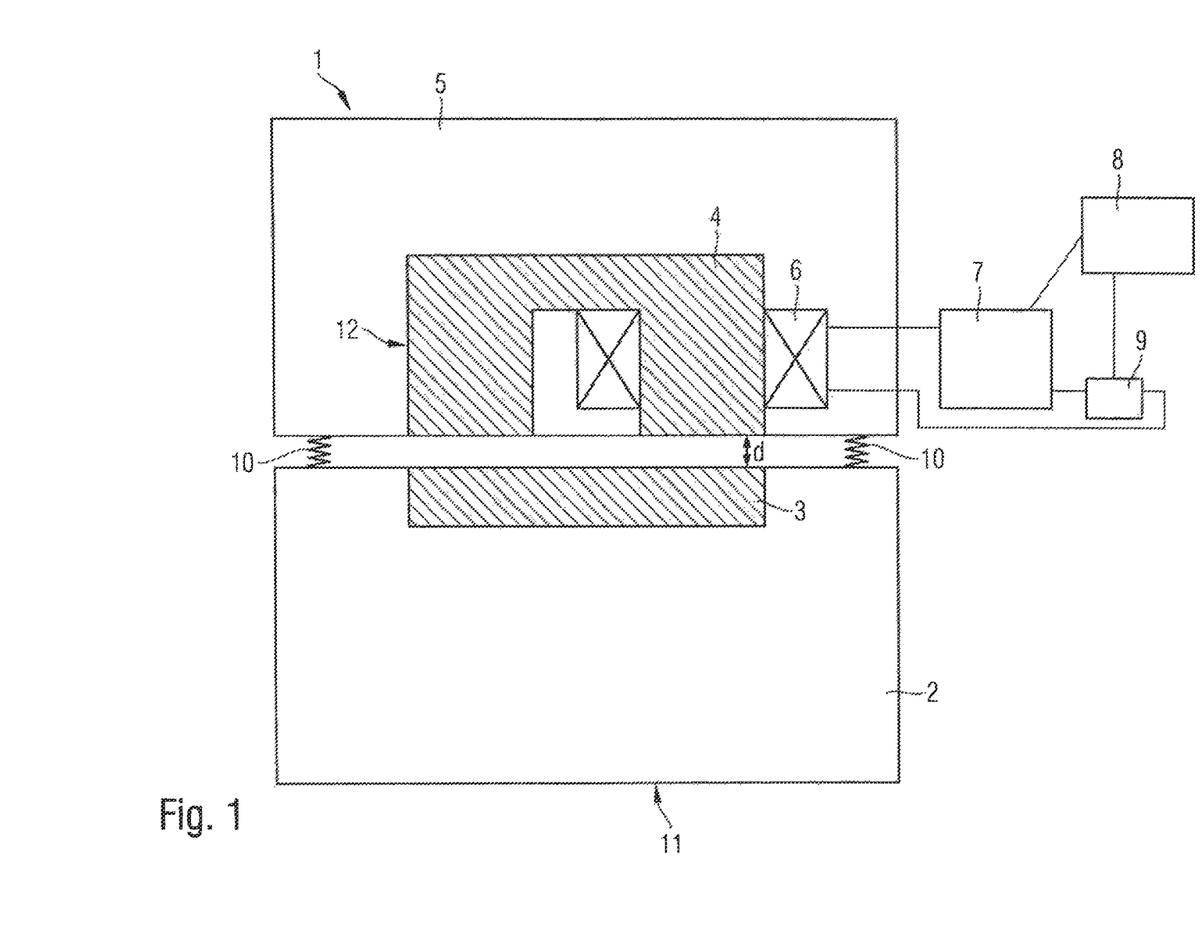
FIG. 1 shows a schematic representation of an embodiment of the assembly according to the present invention.

FIG. 1 shows an embodiment of the assembly according to the invention. It has a control member 1. This control member 1 comprises an operating part 2 defining an operating surface 11 on a surface facing towards the operator. The operating part 2 is movably supported relative to a carrier 5. Furthermore, returning means 10 in the form of springs are provided between the carrier 5 and the operating part 2 in order to cause an elastic return of the operating part 2 into a rest position shown in FIG. 1. Furthermore, an electromagnetic actuator 12 is provided in order to drive the operating part 2 from the rest position, counteracting the operative direction of the returning means. The electromagnetic actuator 12 has a coil 6 on the side of the carrier made from an electrical conductor and a preferably ferromagnetic armature 3 on the side of the operating part, between which an air gap is formed. The current-carrying coil 6 cooperates with the armature 3, driving the operating part 2. The actuator 12 has a ferromagnetic core 4 extending through the coil 6 in order to concentrate or direct the magnetic field generated by the coil 6. The armature 3 on the side of the operating part is configured as a flat armature. The actuator 12 is provided for driving the operating part 2 in a motor-operated manner in order to generate a haptic feedback for the operator by means of the movement of the operating surface 11 under the finger of the operator that contacts the operating surface 11. The motive force of the actuator 12 and thus the effect of the haptic feedback are substantially determined by the clear distance d of the gap, i.e. the clear distance between the core 4 and the armature 3 in its rest position. A change of this distance d associated with the rest state causes an operating point shift of the actuator, because its force is an exponential function of the distance d, the assembly 1 reacts sensitively to a deviation with regard to this distance d.

The motive drive by the actuator 12 is achieved by an electronic control system 7 that applies a control voltage to the coil 6 of the actuator 12. As was explained above, the action of the actuator 12 is dependent, among other things, on the clear distance d. According to the invention, this distance d is indirectly determined via the inductance of the actuator 12. For this purpose, a measuring circuit 9 connected to the electronic control system 7 in an electrically conductive manner and an evaluation unit 8 connected to both in an electrically conductive manner are provided. They are designed to carry out the test method according to the invention as it can be carried out, for example, after the assembly of the control member 1 according to the invention, as suggested in FIG. 2, but also during operation in an intermediary manner between the generation of a haptic feedback caused by an operation or a contact. For this purpose, a short pulse, preferably a square-wave pulse, is input into the actuator 12 with a measuring voltage. Due to its inertia, the operating part 2 including the armature 3 moves only very little. In the process, due to the coil 6 of the actuator 12, the current arising after the test period is dependent, among other things, on the inductance, i.e. ultimately on the clear distance d between the armature 3 and the ferromagnetic core 4 associated with the coil 6. The current arising at the point in time at which the test period elapses, or at least the current arising immediately thereafter—the current continues to flow at approximately the same strength for a certain time—is a measure for the inductance and is measured by the measuring circuit 9, and the measuring signal obtained thereby is evaluated by the evaluation unit 8. For example, the measuring circuit 9 has a shunt for measuring the current.

Figure 2:
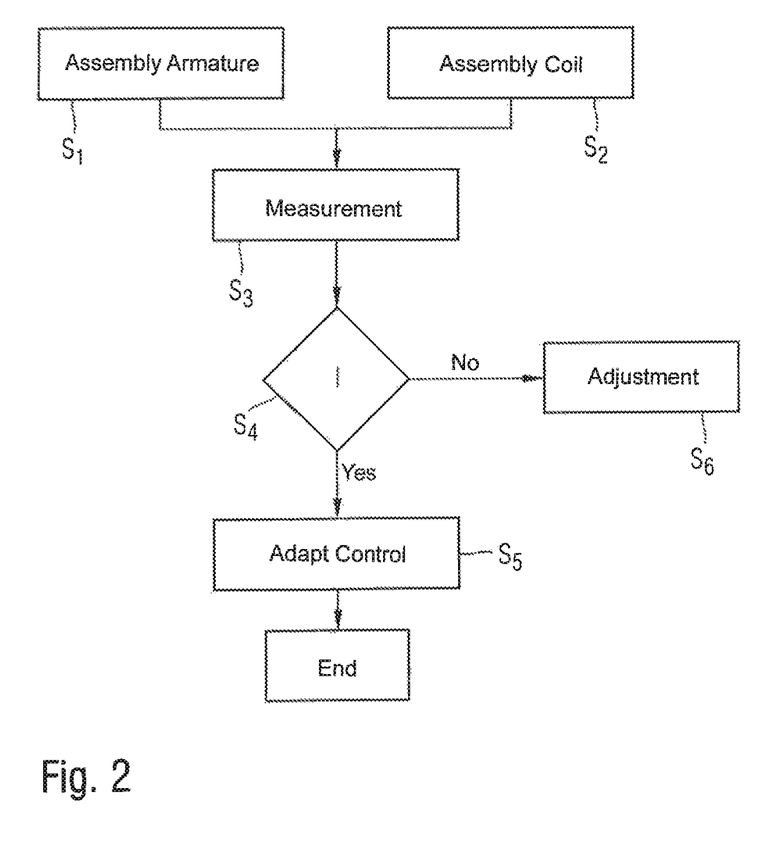
FIG. 2 shows a flowchart for a test method of the assembly according to the present invention.
Figure 5:
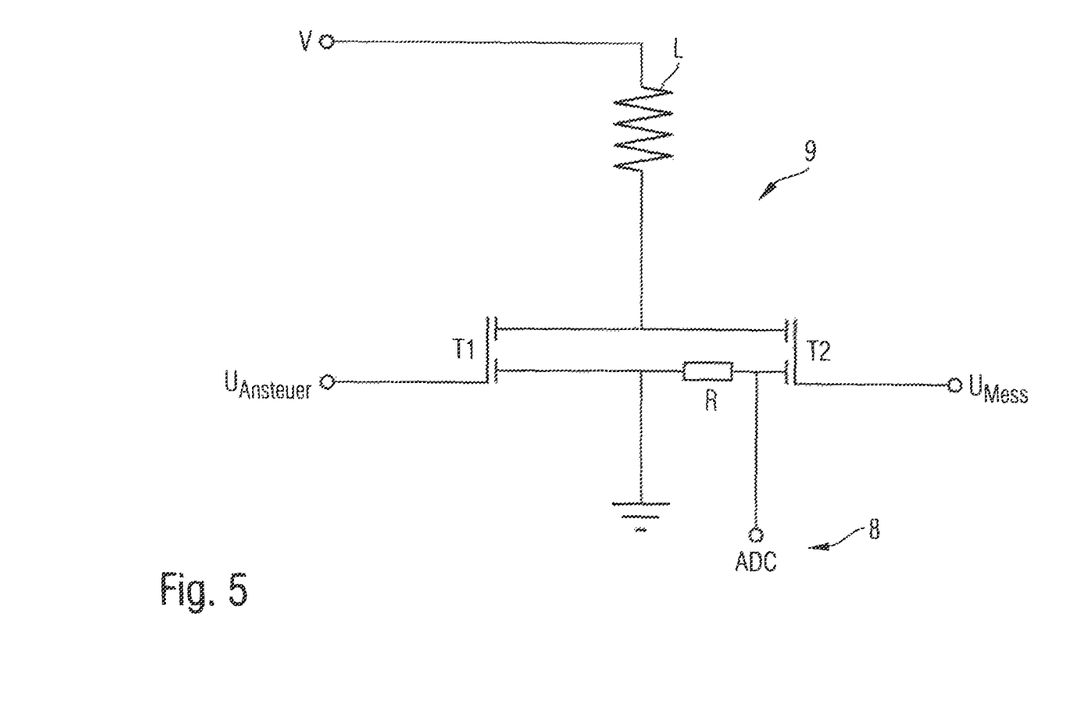
FIG. 5 shows a schematic representation of the measuring circuit according to the present invention.

Preferably, the measurement takes place using a voltage divider in order to generate a measuring signal proportional to the current; a measuring circuit 9 containing such a voltage divider is shown in FIG. 5. The measurement signal generated by the measuring circuit 9 serves an evaluation unit 8 for assignment to a characteristic value of the actuator, preferably of the inductance in its rest state. The term inductance in its rest state is supposed to be understood to mean at least the state in which the operating part 2 and thus the actuator 12 are in the rest state. Preferably, the test period is selected in such a way that the saturation current is not yet reached by the actuator or its coil. For this purpose, a short pulse, preferably a squarewave pulse, is input into the actuator 12 with a measuring voltage. Due to its inertia, the operating part 2 including the armature 3 moves only very little. In the process, due to the coil 6 of the actuator 12, the current arising after the test period is dependent, among other things, on the clear distance d between the armature 3 and the ferromagnetic core 4 associated with the coil 6. This clear distance as a value characteristic for the actuator 12, which is thus determined indirectly, is compared by the evaluation unit 8 with a predetermined value in step S4. If there is no minimum match, a manual adjustment of the relative arrangement of the armature 3 and the coil 6 or core 4 is required in Step S6. The test method can be applied iteratively in order to obtain an optimum alignment and thus a maximum haptic feedback.

In an optional step S5, the control method according to the invention, also referred to as adaptive control method, may also be used by the control voltage, in particular the control voltage pulse, being varied depending on the measured distance d, in particular depending on the measured deviation of the predetermined distance from the measured distance d.

Figure 3:
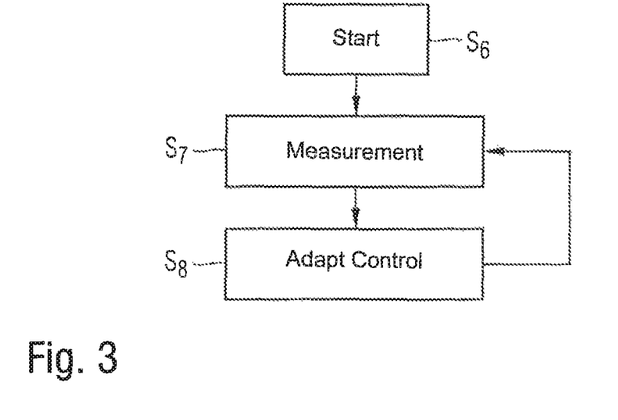
FIG. 3 shows a flowchart for an embodiment of the control method according to the present invention.

An embodiment of the control method according to the invention is described with reference to FIG. 3. After starting the assembly, in particular the electronic control system, in step S6, for example after switching on the engine control of the motor vehicle, the inductive coupling of the actuator is measured in the measuring step S7 of the control method according to the invention, as was described above in the test method. Depending on the characteristic value determined in the measuring step S7, the controlling voltage, in particular the control voltage pulse, is adapted in step S8 by the evaluation unit cooperating with the electronic control system.

Figure 4:
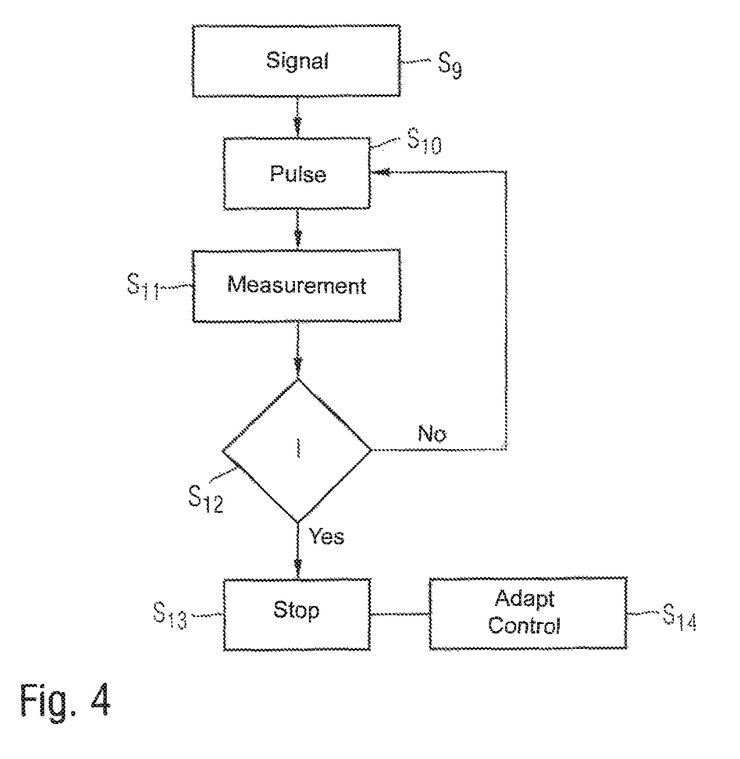
FIG. 4 shows a flowchart for a variation of the control method according to the present invention.

FIG. 4 describes a variation of the control method according to the invention, which is carried out triggered by a signal in step S9. For instance, this triggering takes place in cyclical intervals. Assuming a constant inductance, the current through the actuator, and thus the strength of the force excitation by the actuator 12, also depends on the controlling voltage and the ohmic resistance of the coil 6. The controlling voltage, for example the on-board voltage of the motor vehicle, may fluctuate during operation. In addition, the coil resistance may fluctuate depending on the temperature or for other reasons. In order to improve the haptic feedback, a short pulse, preferably a square-wave pulse, is input into the actuator 12 with a measuring voltage in step S10. Due to its inertia, the operating part 2 including the armature 3 moves only very little. In the process, due to the coil 6 of the actuator 12, the current arising after the test period and measured in step S11 results in a value characteristic for the actuator 12, which is compared by the evaluation unit with a predetermined value in step S12. By comparison and iteratively carrying out the steps S10, S11 and S12, among other things by varying the control parameters, such as the control period, and the comparison with predetermined values by means of a lookup table, such a control period is determined for controlling the actuator, for example, in which the desired controlling behavior and thus the strength of the haptic feedback is reached, and thus the iterative execution of the steps S10, S11, S12 is ended in step S13 in order to carry out the further control, which as a rule was triggered by the detection of a contact or operation of the operating part 2 on its operating surface 12, with the previously determined values in Step S14. It is thus possible by means of the control method according to the invention to at least partially compensate changes in the haptic feedback, for example due to changes in the temperature and the on-board voltage, by varying the control behavior, such as the control voltage and/or the control period.

The measuring circuit 9 according to the invention is described with reference to FIG. 5. The inductance of the actuator 12 is embodied by the inductive resistor L. The measuring circuit comprises two transistors T1 and T2 for selectively applying to the actuator a pulse width modulated control voltage using the transistor T1 and a pulse width modulated measuring voltage using the transistor T2. On the one hand, the control voltage from the supply voltage V is modulated by the controlling voltage $U_{Ansteurer}$ present at the transistor T1, whereas the modulation of the measuring voltage from the supply voltage V is modulated by the controlling voltage $U_{Mess}$ present at the transistor T2. In the measuring step, the transistor T1 is switched to block, whereas the transistor T2 blocks in the control step. At the transistor T2, which is open in the measuring step, a voltage drop occurs at the ohmic resistor R, by which the measuring voltage present at the actuator 12, in this case the coil L, 6 is reduced compared to the supply voltage V. The associated current is determined by means of an analog-digital converter ADC associated with the evaluation unit 8 by determining the voltage dropping at the resistor R at the voltage divider formed from the resistor R and the inductance L of the coil 6.

What has been described above are preferred aspects of the present invention. It is of course not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, combinations, modifications, and variations that fall within the spirit and scope of the appended claims.

What is claimed is:

1. An assembly consisting of a control member, wherein said control comprises a carrier, an operating part movably supported on the carrier, an electromagnetic actuator comprising an armature and a coil for driving the operating part movingly relative to the carrier , the assembly further comprising:

an electronic control system connected in an electrically conductive manner with the electromagnetic actuator for applying a control voltage to the electromagnetic actuator for a predetermined control period in a control step in order to generate a haptic feedback;
a measuring circuit connected in an electrically conductive manner to the electromagnetic actuator for measuring a current present at the electromagnetic actuator and for generating a measuring signal proportional thereto; and
an evaluation unit connected in an electrically conductive manner at least to the measuring circuit and designed, in a measuring step offset in time relative to the control step, to apply a measuring voltage to the electromagnetic actuator by means of the electronic control system for a predetermined test period shorter than the control period, in order to measure by means of the measuring circuit the current which arises at the electromagnetic actuator as the test period elapses due to the application of the measuring voltage and to generate a measuring signal proportional thereto, and in order to obtain a characteristic value of the actuator based on the measuring signal.

2. The assembly according to claim 1, wherein the characteristic value relates to an inductance of the actuator.

3. The assembly according to claim 1, wherein the test period is selected in such a way that the saturation current of the electromagnetic actuator has not yet been reached, and is less than 5.0 ms.

4. The assembly according to claim 1, wherein the test period and the measuring voltage are selected in such a way that the acceleration of the non-operated operating part caused in the measuring step is less than 2.5 g.

5. The assembly according to claim 1, wherein the maximum absolute value of the measuring voltage is less than the maximum absolute value of the control voltage.

6. The assembly according to claim 1, wherein the measuring voltage and/or the control voltage are preferably configured as a square-wave signal and preferably pulse width modulated.

7. The assembly according to claim 1, wherein the evaluation unit and the electronic control system are connected in an electrically conductive manner and are designed to vary the control period and/or the control voltage depending on the characteristic value obtained in the measuring step.

8. The assembly according to claim 1, wherein the coil and the armature are disposed in such a way that the armature is disposed outside the volume defined by the coil in all positions, and the armature is configured as a flat armature.

9. The assembly according to claim 1, wherein at least the electrically conductive connection between the electromagnetic actuator and the evaluation unit is configured in a detachable manner.

10. The assembly according to claim 1, wherein the measuring circuit is configured as a voltage divider, and the current is measured based on a voltage present at the voltage divider.

11. The assembly according to claim 1, wherein the electronic control system and/or the electronic evaluation system and/or the measuring circuit are attached to the control member.

12. A test method comprising the following steps:
providing a control member comprising a carrier, an operating part movably supported on the carrier, an electromagnetic actuator comprising an armature and a coil for driving the operating part movingly relative to the carrier;
providing an electronic control system connected in an electrically conductive manner to the electromagnetic actuator for applying a measuring voltage to the actuator;
providing a measuring circuit connected in an electrically conductive manner to the electromagnetic actuator for measuring a current present at the electromagnetic actuator and for generating a measuring signal proportional thereto; and
providing an evaluation unit connected in an electrically conductive manner at least to the measuring circuit;
applying a measuring voltage to the electromagnetic actuator by means of the electronic control system for a predetermined test period;
measuring by means of the measuring circuit the current which arises at the electromagnetic actuator as the test period elapses due to the application of the measuring voltage;
generating a measuring signal proportional to the measured current by means of the measuring circuit;
evaluation of the measuring signal and assignment, using the evaluation unit, to a value that is characteristic for the electromagnetic actuator, for example relates to an inductance of the actuator, preferably relates to its inductance in its rest position.

13. The test method according to claim 12, wherein the test period is selected in such a way that the saturation current of the electromagnetic actuator has not yet been reached, and the test period is less than 5.0 ms.

14. The test method according claim 12, wherein the test period and the measuring voltage selected during application are selected in such a way that the acceleration of the non-operated operating part caused is less than 2.5 g.

15. The test method according to claim 12, wherein the relative arrangement of the armature and the coil is changed depending on the characteristic value subsequent to the evaluation.

16. A control method, comprising the following steps:
providing a control member comprising a carrier, an operating part movably supported on the carrier, an electromagnetic actuator comprising an armature and a coil for driving the operating part movingly relative to the carrier;
providing an electronic control system connected in an electrically conductive manner to the electromagnetic actuator for applying a control voltage and a measuring voltage to the actuator;
providing a measuring circuit connected in an electrically conductive manner to the electromagnetic actuator for measuring a current present at the electromagnetic actuator and for generating a measuring signal proportional thereto; and
providing an evaluation unit connected in an electrically conductive manner at least to the measuring circuit;
applying a measuring voltage to the electromagnetic actuator by means of the electronic control system for a predetermined test period;
measuring by means of the measuring circuit the current which arises at the electromagnetic actuator as the test period elapses due to the application of the measuring voltage;
generating a measuring signal proportional to the measured current;
evaluation of the measuring signal and assignment, using the evaluation unit, to a value that is characteristic for the electromagnetic actuator, for example relates to an inductance of the actuator, preferably relates to its inductance in its rest position;

determining a specific control voltage and/or a specific control period using the characteristic value, for example by a comparison with predetermined values;

subsequently controlling the electromagnetic actuator with at least one of the specific control voltage and the specific control period by means of the electronic control system.

17. The control method according to claim 16, wherein the test period is shorter than the specific control period.

18. The control method according to claim 16, wherein the test period is selected in such a way that the saturation current of the electromagnetic actuator has not yet been reached, and the test period is less than 5.0 ms.

19. The control method according to claim 16, wherein the test period and the measuring voltage selected during application are selected in such a way that the acceleration of the non-operated operating part caused is less than 2.5 g.

20. The assembly according to claim 2, wherein the characteristic value relates to an inductance of the actuator in the rest position.

21. The assembly according to claim 3, wherein the test period is selected in such a way that the saturation current of the electromagnetic actuator has not yet been reached, and is less than 2.0 ms.

22. The assembly according to claim 21, wherein the test period is selected in such a way that the saturation current of the electromagnetic actuator has not yet been reached, and is 1.0 ms.

23. The assembly according to claim 21, wherein the test period is selected in such a way that the saturation current of the electromagnetic actuator has not yet been reached, and is 0.5 ms.

24. The assembly according to claim 4, wherein the test period and the measuring voltage are selected in such a way that the acceleration of the non-operated operating part caused in the measuring step is less than 1.5 g.

25. The assembly according to claim 24, wherein the test period and the measuring voltage are selected in such a way that the acceleration of the non-operated operating part caused in the measuring step is less than 0.5 g.

26. The assembly according to claim 9, wherein at least the electrically conductive connection between the electromagnetic actuator and the measuring circuit is configured in a detachable manner.

27. The test method according to claim 13, wherein the test period is selected in such a way that the saturation current of the electromagnetic actuator has not yet been reached, and the test period is less than 2.0 ms.

28. The test method according to claim 27, wherein the test period is selected in such a way that the saturation current of the electromagnetic actuator has not yet been reached, and the test period is 1.0 ms.

29. The test method according to claim 27, wherein the test period is selected in such a way that the saturation current of the electromagnetic actuator has not yet been reached, and the test period is 0.5 ms.

30. The test method according claim 14, wherein the test period and the measuring voltage selected during application are selected in such a way that the acceleration of the non-operated operating part caused is less than 1.5 g.

31. The test method according claim 30, wherein the test period and the measuring voltage selected during application are selected in such a way that the acceleration of the non-operated operating part caused is less than 0.5 g.

32. The control method according to claim 18, wherein the test period is selected in such a way that the saturation current of the electromagnetic actuator has not yet been reached, and the test period is less than 2.0 ms.

33. The control method according to claim 32, wherein the test period is selected in such a way that the saturation current of the electromagnetic actuator has not yet been reached, and the test period is 1.0 ms.

34. The control method according to claim 32, wherein the test period is selected in such a way that the saturation current of the electromagnetic actuator has not yet been reached, and the test period is 0.5 ms.

35. The control method according to claim 19, wherein the test period and the measuring voltage selected during application are selected in such a way that the acceleration of the non-operated operating part caused is less than 1.5 g.

36. The control method according to claim 35, wherein the test period and the measuring voltage selected during application are selected in such a way that the acceleration of the non-operated operating part caused is less than 0.5 g.

* * * * *